(12) United States Patent
Jia et al.

(10) Patent No.: US 9,329,331 B2
(45) Date of Patent: May 3, 2016

(54) MOLD FRAME, BACKLIGHT MODULE AND DISPLAY DEVICE

(71) Applicants: Boe Technology Group Co., Ltd., Beijing (CN); Beijing Boe Display Technology Co., Ltd., Beijing (CN)

(72) Inventors: Zhishuai Jia, Beijing (CN); Changjia Fu, Beijing (CN); Shaoan Li, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 106 days.

(21) Appl. No.: 14/499,581

(22) Filed: Sep. 29, 2014

(65) Prior Publication Data
US 2015/0362666 A1    Dec. 17, 2015

(30) Foreign Application Priority Data

Jun. 17, 2014    (CN) .......................... 2014 1 0268844

(51) Int. Cl.
*F21V 8/00* (2006.01)
(52) U.S. Cl.
CPC .............. *G02B 6/0088* (2013.01); *G02B 6/005* (2013.01); *G02B 6/0065* (2013.01)
(58) Field of Classification Search
CPC ..... G02B 6/0088; G02B 6/0065; G02B 6/005
See application file for complete search history.

(56) References Cited

U.S. PATENT DOCUMENTS

| 6,360,074 B1* | 3/2002 | Isogai | ................ G03G 15/2057 399/333 |
| 2010/0238380 A1* | 9/2010 | Kim | ..................... G02B 6/0055 349/67 |

* cited by examiner

*Primary Examiner* — Elmito Breval
(74) *Attorney, Agent, or Firm* — Calfee, Halter & Griswold LLP

(57) ABSTRACT

The present disclosure discloses a mold frame, a backlight module and a display device. The mold frame includes sidewalls for limiting a periphery of a light guide plate and optical films in the backlight module, and a boss for limiting the light guide plate and the optical films in a direction perpendicular to an output surface of the light guide plate. The boss is provide with a recess opening towards the light guide plate. The recess is provided with a number of rollers therein in a lengthwise direction thereof. A diameter of the rollers is greater than a depth of the recess. The mold frame is applied to the backlight module. In assembly, the light guide plate, the light source and the optical films are placed in the mold frame. An outside surface of the roller provided in the boss of the mold frame abuts against the light guide plate, limiting the light guide plate in the direction of the thickness of the backlight module, thereby preventing the light guide plate from warping upward after expansion due to heat. Hence, the mold frame according to the present disclosure may reduce occurrence of phenomena such a slow light incidence efficiency of the backlight module, light leakage of the backlight module and wrinkling of the optical films.

9 Claims, 3 Drawing Sheets

MOLD FRAME, BACKLIGHT MODULE AND DISPLAY DEVICE

RELATED APPLICATIONS

The present application claims the benefit of Chinese Patent Application No. 201410268844.4, filed Jun. 17, 2014, the entire disclosure of which is incorporated herein by reference

BACKGROUND OF THE DISCLOSURE

1. Field of the Disclosure

The present disclosure relates to the technical field of display, and particularly to a mold frame, a backlight module and a display device.

2. Description of the Prior Art

As display technologies develop constantly, people have higher and higher requirements for display devices.

A liquid crystal display device in the prior art is structured as shown in FIG. 5, and it mainly comprises a display panel 01 and a backlight module, wherein the backlight module specifically comprises a mold frame 02, a back plate 06, a light guide plate 03 located between the mold frame 02 and the back plate 06, optical film layers 04 located on an output side of the light guide plate 03, and a light source 05 located at a light incident side of the light guide plate 03. To prevent the light guide plate, expanded due to heat, from generating frictional abnormal noise with the mold frame and from affecting quality of the backlight module, a certain gap L needs to be provided between the mold frame and the light guide plate. However, when the light guide plate warps due to heat, this gap L may cause the light guide plate does not align with the light source in a direction of the thickness of the backlight module (specifically as shown in FIG. 6 which is a structural schematic view of the heat-expanded light guide plate in the display device of FIG. 5), thereby causing occurrence of phenomena such as low light incidence efficiency of the backlight module, light leakage of the backlight module and wrinkling of the optical films.

SUMMARY OF THE DISCLOSURE

In view of the above, the present disclosure provides a technical solution to solve problems such as low light incidence efficiency of the backlight module, light leakage of the backlight module and wrinkling of the optical films.

The present disclosure provides a mold frame for a backlight module which includes: sidewalls for limiting a periphery of a light guide plate and optical films in the backlight module; and a boss for limiting the light guide plate and the optical films in a direction perpendicular to an output surface of the light guide plate. The boss is provide with a recess opening towards the light guide plate. The recess is provided with a plurality of rollers therein in a lengthwise direction thereof. A diameter of the rollers is greater than a depth of the recess.

The mold frame according to the present disclosure is applied to the backlight module. In assembly, the light guide plate, the light source and the optical films are placed in the mold frame, an outside surface of the roller provided in the boss of the mold frame abuts against the light guide plate, limiting the light guide plate in the direction of the thickness of the backlight module, thereby preventing the light guide plate from warping upward after expansion due to heat; besides, since the rollers can rotate, the light guide plate may freely extend or retract or move in the lengthwise direction of the recess, and a position where the light guide plate contacts the rollers will not generate frictional abnormal noise. Hence, the mold frame according to the present disclosure may reduce occurrence of phenomena such as low light incidence efficiency of the backlight module, light leakage of the backlight module and wrinkling of the optical films.

In some alternative embodiments, both ends of the rollers in a thickness direction thereof are respectively provided with a mounting shaft thereon. Two opposed recess walls of the recess in the widthwise direction thereof are provided with mounting holes corresponding one-to-one to and mating with the mounting shafts respectively provided on the plurality of rollers, and the plurality of mounting holes are distributed along the lengthwise direction of the recess at intervals.

In some alternative embodiments, both ends of the rollers in a thickness direction thereof are respectively provided with a mounting shaft thereon, two opposed recess walls of the recess in the widthwise direction thereof are provided with sliding grooves thereat slidingly cooperating with the mounting shafts respectively provided on the plurality of rollers and extending in the lengthwise direction of the recess.

In some alternative embodiments, the plurality of rollers are equidistantly distributed. The equidistantly-distributed rollers may better limit the light guide plate.

In some alternative embodiments, the rollers are made of a rubber material. The rollers of the rubber material may reduce friction between the rollers and the light guide plate.

The present disclosure further provides a backlight module, comprising: a light guide plate, a light source and optical films, and further comprising the mold frame as recited above, wherein the light guide plate, the light source and the optical films are located in the mold frame. A diameter of the rollers provided in the mold frame is substantially equal to a sum of a predetermined distance between the mold frame and the light guide plate and a depth of the recess provided in the mold frame. The mold frame according to the present disclosure may reduce occurrence of phenomena such as low light incidence efficiency of the backlight module, light leakage of the backlight module and wrinkling of the optical films. The display module according to the present disclosure has a higher light utilization rate.

The present disclosure further provides a display device comprising a display panel and the aforesaid backlight module. Since the backlight module has a higher light utilization rate, the display device according to the present disclosure achieves a better display effect.

DETAILED DESCRIPTION OF THE PRESENT DISCLOSURE

Technical solutions in embodiments of the present disclosure will be described clearly and completely with reference to figures in the embodiments. The described embodiments are only partial embodiments of the present disclosure other than all embodiments.

Figure 1:
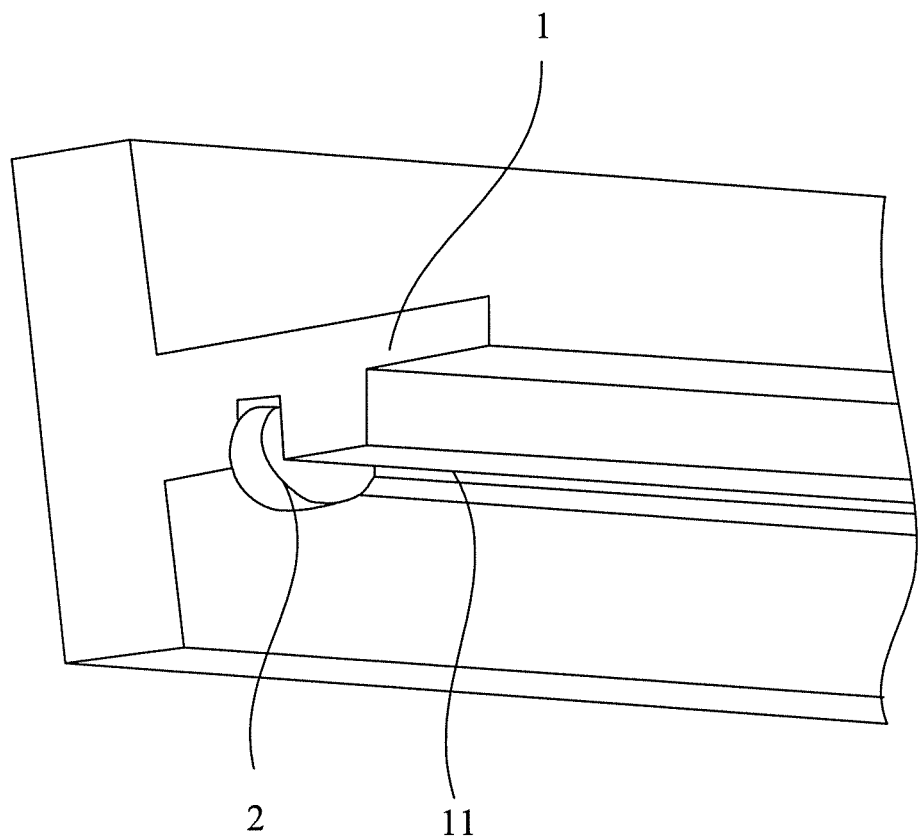
FIG. 1 is a structural schematic view of a mold frame provided by an embodiment of the present disclosure.

FIG. 1 is a structural schematic view of a mold frame provided by an embodiment of the present disclosure. As shown in FIG. 1, the embodiment provides a mold frame for a backlight source, comprising: sidewalls for limiting a periphery of a light guide plate and optical films in the backlight module, and a boss 1 for limiting the light guide plate and the optical films in a direction perpendicular to an output surface of the light guide plate, the boss 1 includes a recess 11 opening towards the light guide plate, the recess 11 includes a plurality of rollers 2 therein in a lengthwise direction thereof. A diameter of the rollers 2 is greater than a depth of the recess 11.

Figure 2:
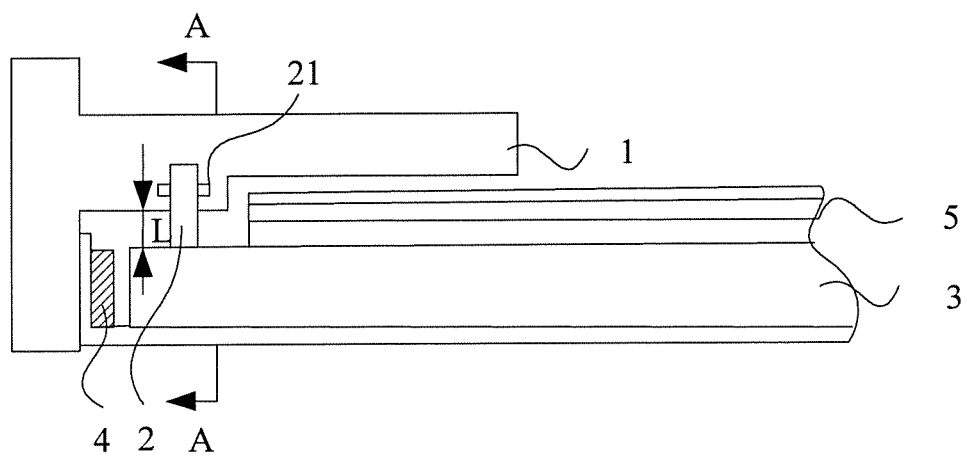
FIG. 2 is a structural schematic view of a backlight module provided by an embodiment of the present disclosure.
Figure 3:
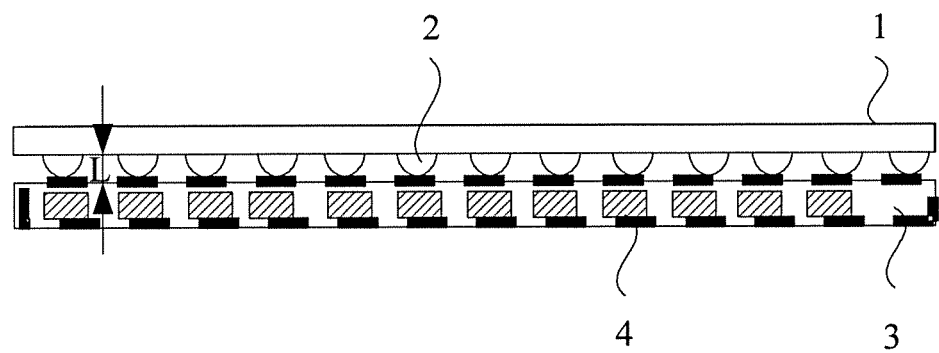
FIG. 3 is a cross-sectional view of the backlight module of FIG. 2 taken along a line A-A.

The mold frame according to the present disclosure is applied to the backlight module, as shown in FIG. 2 and FIG. 3, wherein FIG. 2 is a structural schematic view of a backlight module provided by an embodiment of the present disclosure; and FIG. 3 is a cross-sectional view of the backlight module of FIG. 2 taken along a line A-A. In assembly, the light guide plate 3, the light source 4 and the optical films 5 and the like are placed in the mold frame. An outside surface of the roller 2 provided in the boss 1 of the mold frame abuts against the light guide plate 3, limiting the light guide plate 3 in the direction of the thickness of the backlight module, thereby preventing the light guide plate from warping upward after expansion due to heat. Besides, since the rollers 2 can rotate, the movement of the light guide plate 3 may freely extend or retract or move in the lengthwise direction of the recess 11, and the position where the light guide plate 3 contacts the rollers 2 will not generate noise from friction. Hence, the mold frame according to the present disclosure may reduce occurrence of phenomena such as light leakage of the backlight module and wrinkling of the optical films.

Noticeably, the depth and width of the recess 11 and the diameter and thickness of the rollers 2 may be set by those skilled in the art according to actual needs.

The rollers 2 may cooperate with the recess 11 in many assembly relationships:

In a specific embodiment, both ends of the rollers 2 in a thickness direction thereof are respectively provided with a mounting shaft 21 thereon, two opposed recess walls of the recess 11 in the widthwise direction thereof are provided with mounting holes corresponding one-to-one to and mating with the mounting shafts 21 respectively provided on the plurality of rollers 2, and the plurality of mounting holes are distributed along the lengthwise direction of the recess 11 at an interval. That is to say, the rollers 2 cooperate with and are connected with the recess 11 via the mounting shaft 21. The mounting positions of thus-structured rollers 2 in the recess are fixed, and the rollers can only rotate respectively around the mounting shafts at the mounting positions thereof.

In another specific embodiment, both ends of the rollers 2 in a thickness direction thereof are respectively provided with a mounting shaft 21 thereon, two opposed recess walls of the recess in the widthwise direction thereof are provided with sliding grooves thereat slidingly cooperating with the mounting shafts 21 respectively provided on the plurality of rollers 2 and extending in the lengthwise direction of the recess 11. The aforementioned rollers may freely roll in the lengthwise direction of the recess, namely, the mounting positions of the rollers 2 are not fixed, and the positions of the rollers and a spacing between two adjacent rollers 2 may be adjusted according to needs.

The specific mounting relationships between the rollers and the recess are not limited to the above examples.

Preferably, the plurality of rollers 2 are equidistantly distributed. The equidistantly-distributed rollers 2 may better limit the light guide plate.

In a specific embodiment, the rollers 2 are made of a rubber material. The rollers of rubber material may reduce friction between the rollers and the light guide plate. Certainly, the rollers may also be made of other flexible materials, which will not be detailed here.

As shown in FIG. 2, the present disclosure further provides a backlight module, comprising: a light guide plate 3, a light source 4 and optical films 5 and the mold frame as recited in the above embodiment 1. The light guide plate 3, the light source 4 and the optical films 5 are located in the mold frame. A diameter of the rollers 2 provided in the mold frame is substantially equal to a sum of a predetermined distance L between the mold frame and the light guide plate and a depth of the recess 11 provided in the mold frame.

The mold frame according to the present disclosure may reduce occurrence of phenomena such as light leakage of the backlight module and wrinkling of the optical films. The display module according to the present disclosure has a higher light utilization rate.

Figure 4:
FIG. 4 is a structural schematic view of a display device provided by an embodiment of the present disclosure.
Figure 5:
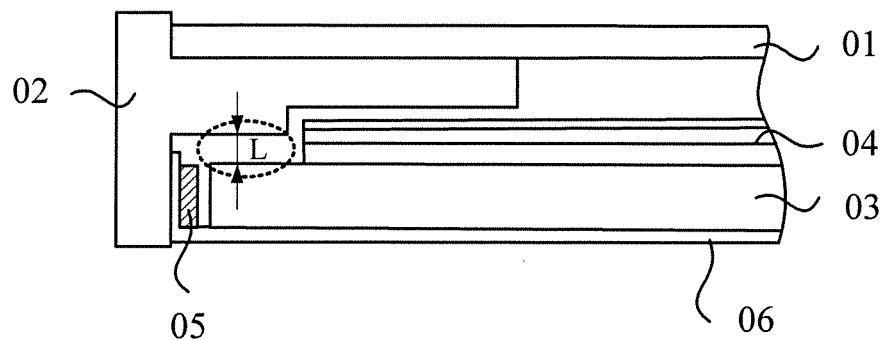
FIG. 5 is a structural schematic view of a display device in the prior art.
Figure 6:
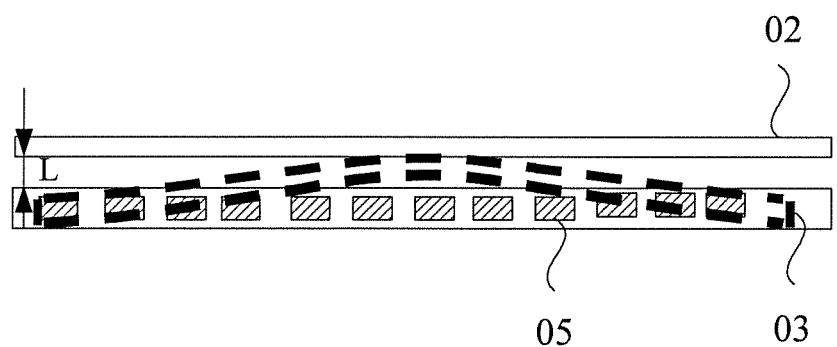
FIG. 6 is a structural schematic view of the heat-expanded light guide plate in the display device of FIG. 5.

FIG. 4 is a structural schematic view of a display device provided by an embodiment of the present disclosure. As shown in FIG. 4, the present disclosure further provides a display device, comprising a display panel 6 and the backlight module as recited in the above embodiment 2.

Since the above-mentioned backlight module has a higher light utilization rate, the display device according to the present disclosure achieves a better display effect.

Obviously, those skilled in the art may make various modifications and variations to the present disclosure without departing from the spirit and scope of the present disclosure. As such, if these modifications and variations to the present disclosure fall with the scope of claims of the present disclosure and equivalent technologies, the present disclosure is intended to include these modifications and variations.

The invention claimed is:

1. A mold frame for a backlight module, comprising:
   sidewalls for limiting a periphery of a light guide plate and optical films in the backlight module; and
   a boss for limiting the light guide plate and the optical films in a direction perpendicular to a output surface of the light guide plate,
   wherein the boss includes a recess opening towards the light guide plate, a plurality of rollers disposed within the recess in a lengthwise direction thereof, the rollers having a diameter that is greater than a depth of the recess.

2. The mold frame according to claim 1, wherein each roller has an axis and is mated to a mounting shaft along its axis that protrudes from each side of each roller, and two opposed walls of the recess include mounting holes corresponding one-to-one to and mating with the mounting shafts respectively provided on the plurality of rollers, and the plurality of mounting holes are distributed along the lengthwise direction of the recess at intervals.

3. The mold frame according to claim 1, wherein each roller has an axis and is mated to a mounting shaft along its axis that protrudes from each side of each roller, and two opposed recess walls of the recess in the widthwise direction thereof include sliding grooves that slidingly interact with the mounting shafts protruding from the plurality of rollers and extending in the lengthwise direction of the recess.

4. The mold frame according to claim 2, wherein the plurality of rollers are equidistantly distributed in the recess.

5. The mold frame according to claim 3, wherein the plurality of rollers are equidistantly distributed in the recess.

6. The mold frame according to claim 4, wherein the rollers are made of a rubber material.

7. The mold frame according to claim 5, wherein the rollers are made of a rubber material.

8. A backlight module, comprising:
a light guide plate;
a light source;
optical films; and
a mold frame further comprising sidewalls for limiting a periphery of a light guide plate and optical films; and a boss for limiting the light guide plate and the optical films in a direction perpendicular to a output surface of the light guide plate, wherein the boss includes a recess opening towards the light guide plate, a plurality of rollers disposed within the recess in a lengthwise direction thereof, the rollers having a diameter that is greater than a depth of the recess;
wherein the light guide plate, the light source and the optical films are located in the mold frame, and a diameter of the rollers provided in the mold frame is substantially equal to a sum of a predetermined distance between the mold frame and the light guide plate and a depth of the recess provided in the mold frame.

9. A display device, comprising:
a display panel; and
a backlight module, further comprising a light guide plate; a light source; optical films; and
a mold frame further comprising sidewalls for limiting a periphery of a light guide plate and optical films; and a boss for limiting the light guide plate and the optical films in a direction perpendicular to a output surface of the light guide plate, wherein the boss includes a recess opening towards the light guide plate, a plurality of rollers disposed within the recess in a lengthwise direction thereof, the rollers having a diameter that is greater than a depth of the recess;
wherein the light guide plate, the light source and the optical films are located in the mold frame, and a diameter of the rollers provided in the mold frame is substantially equal to a sum of a predetermined distance between the mold frame and the light guide plate and a depth of the recess provided in the mold frame.

* * * * *